US011392991B2

(12) United States Patent
Turner et al.

(10) Patent No.: US 11,392,991 B2
(45) Date of Patent: Jul. 19, 2022

(54) MEDIA LEDGER FOR SHARING CONSUMER DATA

(71) Applicants: Sony Pictures Entertainment Inc., Culver City, CA (US); Sony Corporation, Tokyo (JP); CRACKLE, INC., Culver City, CA (US)

(72) Inventors: Kaigani Turner, Culver City, CA (US); Shriyamvar Bugga, Culver City, CA (US); Matia Wagabaza, Culver City, CA (US)

(73) Assignees: Sony Pictures Entertainment, Inc., Culver City, CA (US); Sony Corporation, Tokyo (JP)

( * ) Notice: Subject to any disclaimer, the term of this patent is extended or adjusted under 35 U.S.C. 154(b) by 364 days.

(21) Appl. No.: 15/986,723

(22) Filed: May 22, 2018

(65) Prior Publication Data
US 2019/0362389 A1  Nov. 28, 2019

(51) Int. Cl.
*G06Q 30/02* (2012.01)
*G06Q 20/36* (2012.01)
*G06Q 20/38* (2012.01)

(52) U.S. Cl.
CPC ....... *G06Q 30/0269* (2013.01); *G06Q 20/367* (2013.01); *G06Q 20/382* (2013.01)

(58) Field of Classification Search
CPC ............ G06Q 30/0269; G06Q 20/367; G06Q 20/382; G06Q 2220/00; G06Q 20/0655; G06Q 20/1235; G06Q 20/389
See application file for complete search history.

(56) References Cited

U.S. PATENT DOCUMENTS

| 8,055,536 | B1 | 11/2011 | Olaiya et al. |
| 2002/0120515 | A1 | 8/2002 | Morimoto et al. |
| 2015/0371224 | A1* | 12/2015 | Lingappa ........... G06Q 20/3829 705/71 |
| 2017/0140408 | A1 | 5/2017 | Wuehler |
| 2017/0177898 | A1* | 6/2017 | Dillenberger ......... H04L 9/3236 |
| 2019/0095907 | A1* | 3/2019 | Govindarajan ........... H04L 9/12 |
| 2019/0173872 | A1* | 6/2019 | Arora ................. G06Q 20/3825 |
| 2019/0188411 | A1* | 6/2019 | Kroutik ................. H04L 9/0894 |

OTHER PUBLICATIONS

Lederer et al., Loomia Tile A Decentralized Platform for Identity and Personal Data; LOOMIA; Jan. 2018; V1.2; 14 pages.

* cited by examiner

Primary Examiner — Alexandru Cirnu
(74) Attorney, Agent, or Firm — Procopio, Cory, Hargreaves & Savitch LLP

(57) ABSTRACT

Linking a consumption history of media to a consumer, including: creating a profile of the consumer using a blockchain-based media ledger; enabling the consumer to subscribe to advertisement networks; recording at least one of consumptions of the media and transactions by the consumer as a media consumption history on a content catalog of a digital right management (DRM); and ingesting the media consumption history into the blockchain-based media ledger from the content catalog of the DRM. Keywords include blockchain, advertising, cryptographic tokens, and DRM.

10 Claims, 3 Drawing Sheets

MEDIA LEDGER FOR SHARING CONSUMER DATA

BACKGROUND

Field

The present disclosure relates to sharing consumer data, and more specifically, to generating a media ledger for sharing the consumer data.

Background

Currently, sharing of consumer data in a singular view, which provides an overview of the consumer data across different parts of a business, has been inadequate. For example, currently, it is difficult to recognize the consumer from one part of the business so that the consumer can be targeted and/or rewarded at another part of the business. Some approaches involved building and integrating a shared platform (e.g., a single sign on) or storing the consumer data in a shared database. However, these approaches do not provide good enough solutions, since the approaches are vulnerable to data breaches. In other examples, untargeted advertisements are not only ineffective, but can be counter-productive since the consumer may perceive the advertisements as wasting time and leave the online site.

SUMMARY

The present disclosure provides for secure and accurate solutions for linking a media consumption history (including the consumption of advertisements) to accounts of a consumer of media products, services, and platforms.

In one implementation, a method for linking a consumption history of media to a consumer is disclosed. The method includes: creating a profile of the consumer using a blockchain-based media ledger; enabling the consumer to subscribe to advertisement networks; recording at least one of consumptions of the media and transactions by the consumer as a media consumption history on a content catalog of a digital right management (DRM); and ingesting the media consumption history into the blockchain-based media ledger from the content catalog of the DRM.

In one implementation, the method further includes enabling the consumer to control access to the media consumption history in the blockchain-based media ledger. In one implementation, enabling the consumer to control access includes generating cryptographic tokens from an interaction between the DRM and the blockchain-based media ledger. In one implementation, the interaction between the DRM and the blockchain-based media ledger uses a proof-of-engagement algorithm that involves participation by the consumer to determine the amount of the cryptographic tokens to be received by the consumer. In one implementation, the cryptographic tokens are entries in the blockchain-based media ledger. In one implementation, enabling the consumer to control access includes applying the cryptographic tokens to a private key of the consumer, wherein the private key is associated with a digital wallet of the consumer. In one implementation, the private key of the consumer is encrypted as a personal history stored on the blockchain-based media ledger. In one implementation, the at least one of the consumptions of the media and the transactions include at least one of watching video, listening to music, and viewing advertisements. In one implementation, the DRM is managed by at least one publisher of the media.

In another implementation, a non-transitory computer-readable storage medium storing a computer program to link a consumption history of media to a consumer is disclosed. The computer program includes executable instructions that cause a computer to: create a profile of the consumer using a blockchain-based media ledger; enable the consumer to subscribe to advertisement networks; record at least one of consumptions of the media and transactions by the consumer as a media consumption history on a content catalog of a digital right management (DRM); and ingest the media consumption history into the blockchain-based media ledger from the content catalog of the DRM.

In one implementation, the computer program further includes executable instructions that cause the computer to enable the consumer to control access to the media consumption history in the blockchain-based media ledger. In one implementation, the executable instructions that cause the computer to enable the consumer to control access include executable instructions that cause the computer to generate cryptographic tokens from an interaction between the DRM and the blockchain-based media ledger. In one implementation, the interaction between the DRM and the blockchain-based media ledger uses a proof-of-engagement algorithm that involves participation by the consumer to determine the amount of the cryptographic tokens to be received by the consumer. In one implementation, the cryptographic tokens are entries in the blockchain-based media ledger. In one implementation, the executable instructions that cause the computer to enable the consumer to control access include executable instructions that cause the computer to apply the cryptographic tokens to a private key of the consumer, wherein the private key is associated with a digital wallet of the consumer. In one implementation, the private key of the consumer is encrypted as a personal history stored on the blockchain-based media ledger. In one implementation, the at least one of the consumptions of the media and the transactions include at least one of watching video, listening to music, and viewing advertisements.

In yet another implementation, a system for linking a media consumption history to a consumer is disclosed. The system includes: a digital right management (DRM) to create a profile of the consumer, the DRM also configured to record the at least one of consumptions of the media and transactions of the consumer as the media consumption history; and a blockchain-based media ledger to ingest the media consumption history from the DRM when the consumer consumes the media or makes transaction with the DRM.

In one implementation, the system further includes a consumer profile created using the blockchain-based media ledger. In one implementation, the system further includes a plurality of advertisement networks to enable the consumer to subscribe using the consumer profile, and to control access to the media consumption history data in the media ledger.

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

Figure 1:
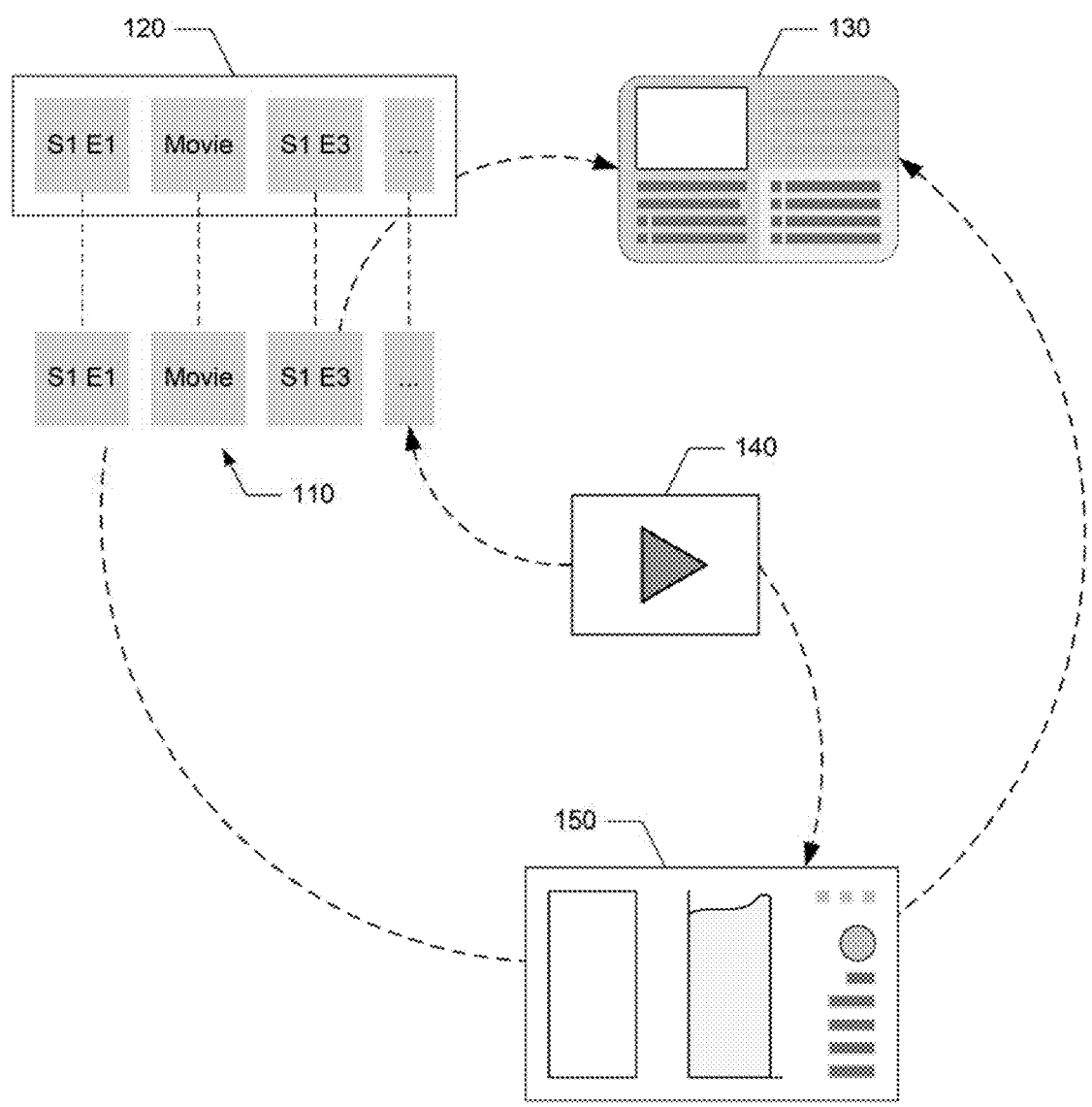
FIG. 1 is an overview diagram of a system for linking a media consumption history to an account of the consumer using a blockchain-based media ledger 110 in accordance with one implementation of the present disclosure.

Certain implementations of the present disclosure provide for secure and accurate solutions for linking a media consumption history (including the consumption of advertisements) to accounts of a consumer of media products, services, and platforms. The solutions provide a single view of the consumer across the media services and platforms using a blockchain-based media ledger. The media ledger provides an open protocol that allows consumers to be involved in and be rewarded for sharing the data with the media service providers. The media ledger also improves the consumer relationship with many touchpoints across the media products, services, and platforms.

After reading these descriptions, it will become apparent how to implement the disclosure in various implementations and applications. Although various implementations of the present disclosure will be described herein, it is understood that these implementations are presented by way of example only, and not limitation. As such, this detailed description of various implementations should not be construed to limit the scope or breadth of the present disclosure.

In one implementation, when a consumer consumes media and transacts with the digital rights management (DRM), the consumption and the transaction are recorded on a media ledger using metadata. The metadata is encrypted and preserved on a digital blockchain and shared across different parts of the business (i.e., services and platforms). Thus, a complete history of the consumer's media consumption habits (e.g. videos watched, music listened to, and/or advertisements viewed) is recorded on the digital blockchain. In another implementation, the service provider hosts media on a distributed media ledger.

Since the consumer owns the data stored in the blockchain, the consumer can decide to reveal only the relevant data to the advertising and/or marketing networks in return for cryptographic tokens (or token rewards). The cryptographic tokens exist conceptually as entries on the blockchain-based media ledger. The tokens are applied to keys that allow creation of a new entry on the media ledger and reassign the ownership to someone else. Thus, the tokens enable the consumer to control and manage digital resources.

In one implementation, the tokens are applied to the consumer's private key, which is associated with a digital wallet. The tokens are generated from the interaction between the DRM and the blockchain using a proof-of-engagement algorithm that involves consumer participation to determine the yield or amount of the token rewards. The generated tokens are used as a reward/payment by the advertising and/or marketing networks to the consumer for sharing the media consumption history.

In one implementation, the private key owned by the consumer is encrypted as a personal history stored on the media ledger blockchain and the blockchain can be moved freely between providers without necessitating a login or registration. The consumer can reveal as much or as little data as the consumer sees fit in the value exchange for how the data is being used.

FIG. 1 is an overview diagram 100 of a system for linking a media consumption history 110 to an account of the consumer using a blockchain-based media ledger 120 in accordance with one implementation of the present disclosure. In the illustrated implementation of FIG. 1, the system 100 includes the media consumption history 110, the media ledger 120, a consumer profile 130, and advertising/marketing networks 150 including a media and advertisement consumption playback 140.

In one implementation, the media ledger 120 is configured to ingest the media consumption history 110 of the consumer from a content catalog of the DRM. Using the media ledger 120, the consumer creates the profile 130, subscribes to the advertisement networks 150, and controls access to the media consumption history data 110 in the media ledger 120. Thus, when the consumer consumes media and transacts with the DRM, the consumption and the transaction are recorded on the media ledger 120 using metadata. The metadata is encrypted and preserved on a digital blockchain and shared across different parts of the business (i.e., services and platforms). Accordingly, a complete history of the consumer's media consumption habits (e.g. videos watched, music listened to, and/or advertisements viewed) is recorded on the digital blockchain. Since the consumer owns the data (e.g., the media ledger 120) stored in the blockchain, the consumer can decide to reveal only the data the consumer is willing to reveal to the advertising/marketing networks 150 in return for tokens earned through the reward unit 140.

In one implementation, the tokens are applied to the consumer's private key in the blockchain, which is associated with a digital wallet. The tokens are generated from the interaction between the media ledger 120 and the blockchain using a proof-of-engagement algorithm that involves consumer participation to determine the yield of the token rewards. In one implementation, the private key owned by the consumer is encrypted as a personal history stored on the media ledger blockchain and the blockchain can be moved freely between providers without necessitating a login or registration. The consumer can reveal as much or as little data as the consumer sees fit in the value exchange for how the data is being used.

The blockchain data structure is an ordered list of blocks. Each block points back to its predecessor until the first block, which is sometimes referred to as the genesis block. The blocks and their sequencing are protected in integrity by backward-linking of cryptographic hashes. There are many blockchains and usage of blockchains, but the most famous ones are Bitcoin and Ethereum.

Figure 2:
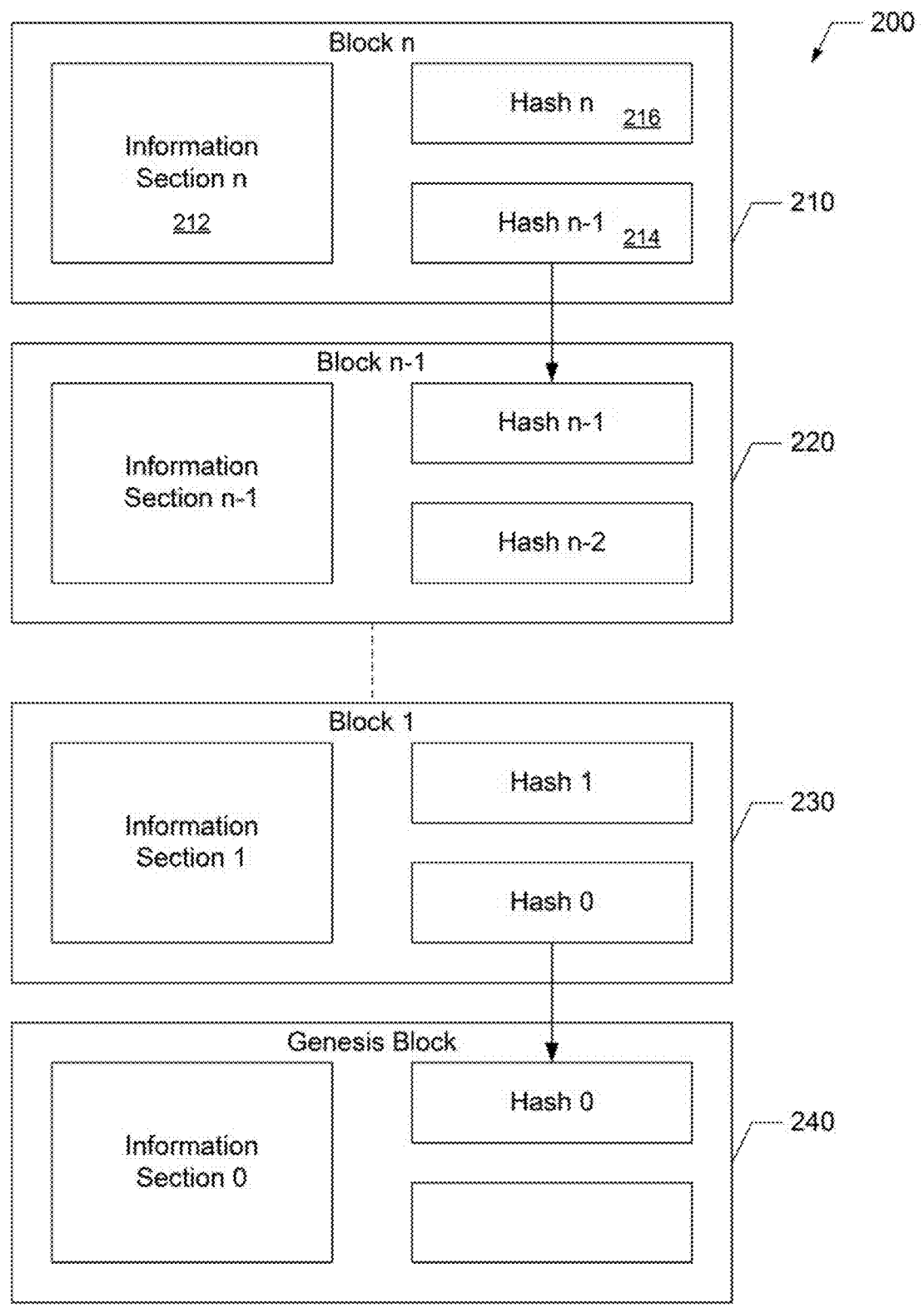
FIG. 2 is a block diagram of a blockchain including n blocks and a genesis block.

FIG. 2 is a block diagram of a blockchain 200 including n blocks 210, 220, 230 and a genesis block 240. In one implementation, a block has at least three elements: (a) an information section (e.g., 212) that stores the registered data and ancillary data, wherein the information section may be signed to prove its authenticity; (b) the cryptographic hash (e.g., 214) of the previous block (the genesis block will not have a previous block); and (c) the cryptographic hash (e.g., 216) of the current block. Thus, the data structure of the blockchain provides an append-only global log, which is tamper evident.

Figure 3:
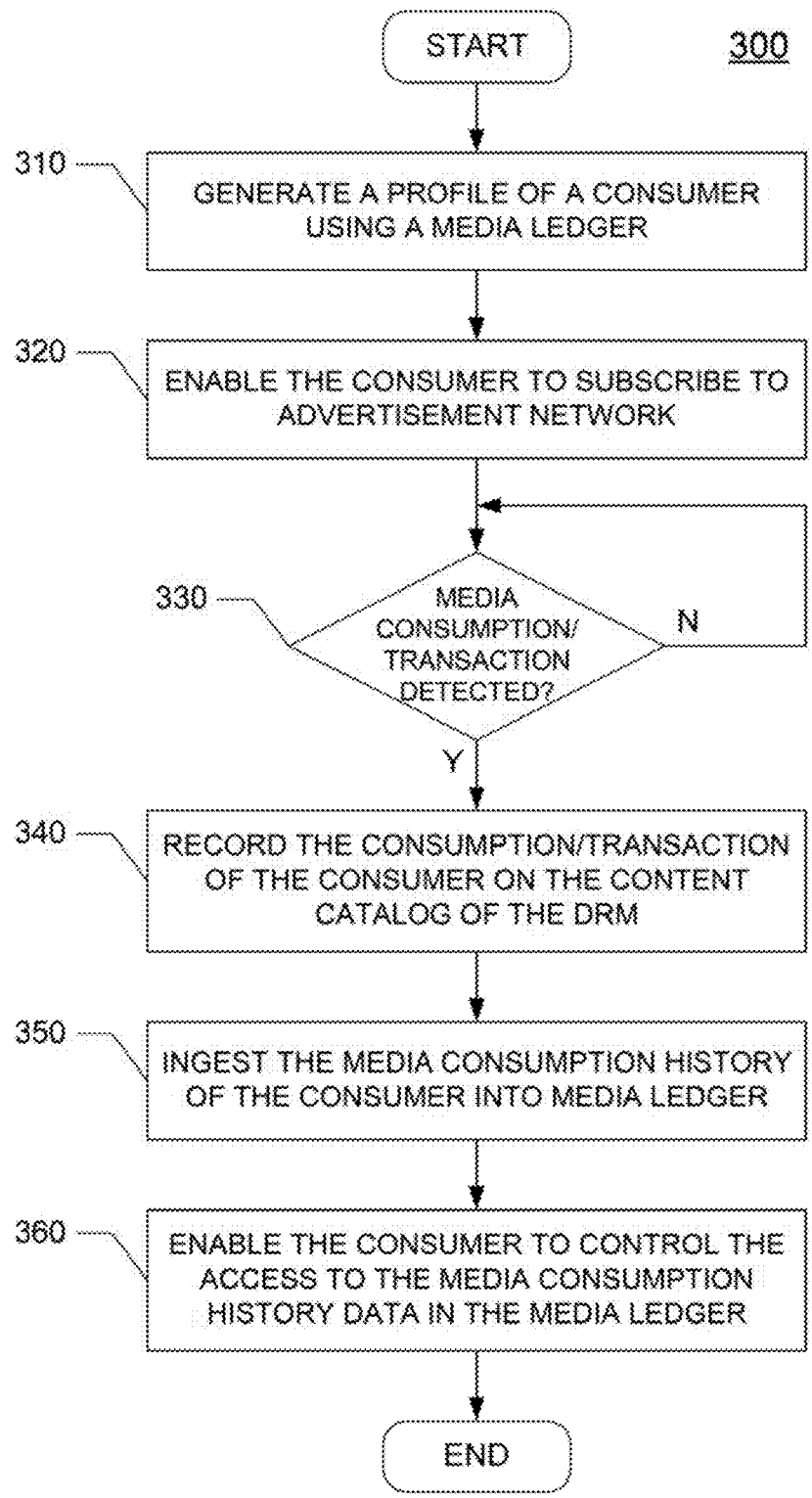
FIG. 3 is a flow diagram of a process for linking a media consumption history to a consumer using a blockchain-based media ledger in accordance with one implementation of the present disclosure.

FIG. 3 is a flow diagram 300 of a process for linking a media consumption history to a consumer using a blockchain-based media ledger in accordance with one implementation of the present disclosure.

In the illustrated implementation of FIG. 3, a profile of the consumer is created, at step 310, using a media ledger. The creation of the consumer profile, at step 310, enables the consumer to subscribe to advertisement networks, at step 320. Subsequently, when the consumer consumes media and transacts with the DRM, at step 330, the consumptions and/or the transactions of the consumer are recorded on the content catalog of the DRM, at step 340, using metadata. Further, the media consumption history of the consumer is ingested, at step 350, into the media ledger from a content catalog of the DRM. In one implementation, the DRM is managed by at least one publisher of the media.

The consumer is then enabled, at step 360, to control the access to the media consumption history data in the media ledger. For example, since the consumer owns the data stored in the blockchain-based media ledger, the consumer is enabled to reveal only what the consumer wants to reveal to the advertising/marketing networks in return for the tokens. In one implementation, the tokens are applied to the consumer's private key in the blockchain, which is associated with a digital wallet. Because the metadata stored in the media ledger is encrypted and preserved on a digital blockchain, the media ledger can be shared across different parts of the business (i.e., services and platforms). Accordingly, a complete history of the consumer's media consumption habits is recorded on the digital blockchain.

The description herein of the disclosed implementations is provided to enable any person skilled in the art to make or use the present disclosure. Numerous modifications to these implementations would be readily apparent to those skilled in the art, and the principals defined herein can be applied to other implementations without departing from the spirit or scope of the present disclosure. Thus, the present disclosure is not intended to be limited to the implementations shown herein but is to be accorded the widest scope consistent with the principal and novel features disclosed herein.

Various implementations of the present disclosure are realized in electronic hardware, computer software, or combinations of these technologies. Some implementations include one or more computer programs executed by one or more computing devices. In general, the computing device includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., game controllers, mice and keyboards), and one or more output devices (e.g., display devices).

The computer programs include executable code that is usually stored in a persistent storage medium and then copied into memory at run-time. At least one processor executes the code by retrieving program instructions from memory in a prescribed order. When executing the program code, the computer receives data from the input and/or storage devices, performs operations on the data, and then delivers the resulting data to the output and/or storage devices.

Those of skill in the art will appreciate that the various illustrative modules and method steps described herein can be implemented as electronic hardware, software, firmware or combinations of the foregoing. To clearly illustrate this interchangeability of hardware and software, various illustrative modules and method steps have been described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the present disclosure. In addition, the grouping of functions within a module or step is for ease of description. Specific functions can be moved from one module or step to another without departing from the present disclosure.

All features of each above-discussed example are not necessarily required in a particular implementation of the present disclosure. Further, it is to be understood that the description and drawings presented herein are representative of the subject matter which is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A method for linking a media consumption history to a consumer using a blockchain, the method comprising:
   generating a profile of the consumer using a media ledger;
   enabling the consumer to subscribe to an advertisement network to control access to the generated profile;
   detecting that the consumer has performed at least one of consumptions of media and transactions;
   recording the at least one of consumptions of media and transactions by the consumer as a media consumption history on a content catalog of a digital rights management (DRM);
   enabling the consumer to control access to the media consumption history in the media ledger by generating cryptographic tokens from an interaction between the DRM and the media ledger and applying the cryptographic tokens to a private key of the consumer in the blockchain, such that when the consumer reveals self-determined relevant data, the consumer receives the cryptographic tokens in return, wherein the private key is associated with a digital wallet of the consumer.

2. The method of claim 1, wherein the interaction between the DRM and the media ledger involves participation by the consumer to determine the amount of the cryptographic tokens to be received by the consumer.

3. The method of claim 1, wherein the cryptographic tokens are entries in the media ledger.

4. The method of claim 1, wherein the private key of the consumer is encrypted as a personal history stored on the media ledger.

5. The method of claim 1, wherein the at least one of the consumptions of the media and the transactions include at least one of watching video, listening to music, and viewing advertisements.

6. A non-transitory computer-readable storage medium storing a computer program to link a media consumption history to a consumer using a blockchain, the computer program comprising executable instructions that cause a computer to:
   generate a profile of the consumer using a media ledger;
   enable the consumer to subscribe to an advertisement network to control access to the generated profile;
   detect that the consumer has performed at least one of consumptions of media and transactions;

record the at least one of consumptions of media and transactions by the consumer as the media consumption history on a content catalog of a digital rights management (DRM);

enable the consumer to control access to the media consumption history in the media ledger by generating cryptographic tokens from an interaction between the DRM and the media ledger and applying the cryptographic tokens to a private key of the consumer in the blockchain, such that when the consumer decides to reveal only reveals self-determined relevant data, the consumer receives the cryptographic tokens in return, wherein the private key is associated with a digital wallet of the consumer.

7. The non-transitory computer-readable storage medium of claim 6, wherein the interaction between the DRM and the media ledger involves participation by the consumer to determine the amount of the cryptographic tokens to be received by the consumer.

8. The non-transitory computer-readable storage medium of claim 6, wherein the cryptographic tokens are entries in the media ledger.

9. The non-transitory computer-readable storage medium of claim 6, wherein the private key of the consumer is encrypted as a personal history stored on the media ledger.

10. The non-transitory computer-readable storage medium of claim 6, wherein the at least one of the consumptions of the media and the transactions in at least one of watching video, listening to music, and viewing advertisements.

* * * * *